(12) United States Patent
Nishina

(10) Patent No.: US 7,179,533 B2
(45) Date of Patent: Feb. 20, 2007

(54) FABRICATION OF QUARTZ-CLAD CARBON NANOTUBE BUNDLES

(76) Inventor: Yuichiro Nishina, 3-8-9 Komegafukuro, Aobaku, Sendai (JP) 980-0813

(*) Notice: Subject to any disclaimer, the term of this patent is extended or adjusted under 35 U.S.C. 154(b) by 281 days.

(21) Appl. No.: 10/812,856

(22) Filed: Mar. 30, 2004

(65) Prior Publication Data

US 2005/0220696 A1 Oct. 6, 2005

(51) Int. Cl.
*B32B 9/00* (2006.01)
(52) U.S. Cl. ............................ 428/408; 977/742
(58) Field of Classification Search .......... 428/408; 977/DIG. 1
See application file for complete search history.

(56) References Cited

U.S. PATENT DOCUMENTS 6,183,714 B1* 2/2001 Smalley et al. .......... 423/447.3

* cited by examiner

*Primary Examiner*—John J. Zimmerman
*Assistant Examiner*—Daniel Miller
(74) *Attorney, Agent, or Firm*—Arnold B. Silverman; Daniel P. Cillo; Eckert, Seamans, Cherin & Mellott, LLC

(57) ABSTRACT

To develop a method of fabricating carbon nanotube bundles clad in a quartz sheath with high temperature and chemical resistance.

The microcrystalline carbon nanotube sample in powder form is vacuum-sealed within a quartz tube sheath and heated to the softening temperature of quartz, then quickly quenched to room temperature while simultaneously extending or "drawing" the quartz tube along its major axis.

3 Claims, 8 Drawing Sheets

The principle of measuring critical tension when the quartz-clad nano-tube bundles reach their limit for keeping the bundles from cutting off.

[Figure 1] The principle of measuring critical tension when the quartz-clad nano-tube bundles reach their limit for keeping the bundles from cutting off.

{Figure 2} The schematic diagram for measuring Raman spectra of the of the nano-tube bundles.

[Figure 3] The procedure for fabricating carbon carbon nano-tube bundles by first, heating the carbon nano-tube/quartz assembly, then subsequently quenching the assembly and while simultaneously extending the quartz tube longitudinally along its axis.

{Figure 4} Three types of molecular structures of carbon nano-tubes used in the present measurements. (A),(B) and (C) are, Arm-Chair Type, Zig-Zag type, and Chiral type, respectively.

[Figure 5] The plot of the critical tension measured vs. the cross-sectional diameter. The water weight on the fiber is given as a parameter. A plot on the curve represents a sample being cut off at respective critical load.

[Figure 6] The Raman spectrum of a typical sanple of carbon nano-tube bundles clad in a quartz sheath.

{Figure 7} The Raman spectrum of a typical sample of carbon nano-tube fiber bundles clad in quartz sheath. The sample is quenched from a temperature near 1,200 C.

{Figure 8} The Raman spectrum of a typical sample of carbon nano-tube bundles with some imperfections. Note the L~T splitting near 1580 cm$^{-1}$ is not clearly resolved. Compare with Figure 6.

FABRICATION OF QUARTZ-CLAD CARBON NANOTUBE BUNDLES

BACKGROUND OF THE INVENTION

1. Field of the Invention

The present invention relates to a method more specifically of quartz-clad carbon nanotube bundles in a simplified way. This quartz-clad bundle is heat-resistant up to the environment temperature of 900° C. Since the quartz plays the role of a protective sheath, the carbon nanotube bundles do not react with acid or other toxic substances.

2. Description of the Prior Art

The mechanical properties of the carbon nanotubes have been measured using the technique of tunneling microscopy to measure the elastic constants of the carbon nanotube. No result, however, has verified the presence of an elastic limit beyond which the carbon nanotube is cut off.

The samples investigated to date have been exposed to nitrogen gas flow and pulled instantly while subject to the heat treatment. Following this process, the microstructure of the graphene on the surface of the nanotube and its relationship with the critical tension has been established.

SUMMARY OF THE INVENTION

The method of solving the technical problem in the previous section [0002] is to analyze the heating and expanding process step by step so that one clarifies which step of the fabrication affects the structural degree of perfection more than anything else.

Thus, the present inventor has developed a novel method of fabricating quartz-clad bundles of carbon nanotubes in a simplified way. This quartz-clad bundle is heat-resistant up to the environmental temperature of 900° C. Since the carbon is sealed and covered in a quartz tube, it is chemically stable as far as the quartz does not react with acid nor other toxic substances in its environment.

PREFERRED EMBODIMENTS OF THE INVENTION

Figure 1:
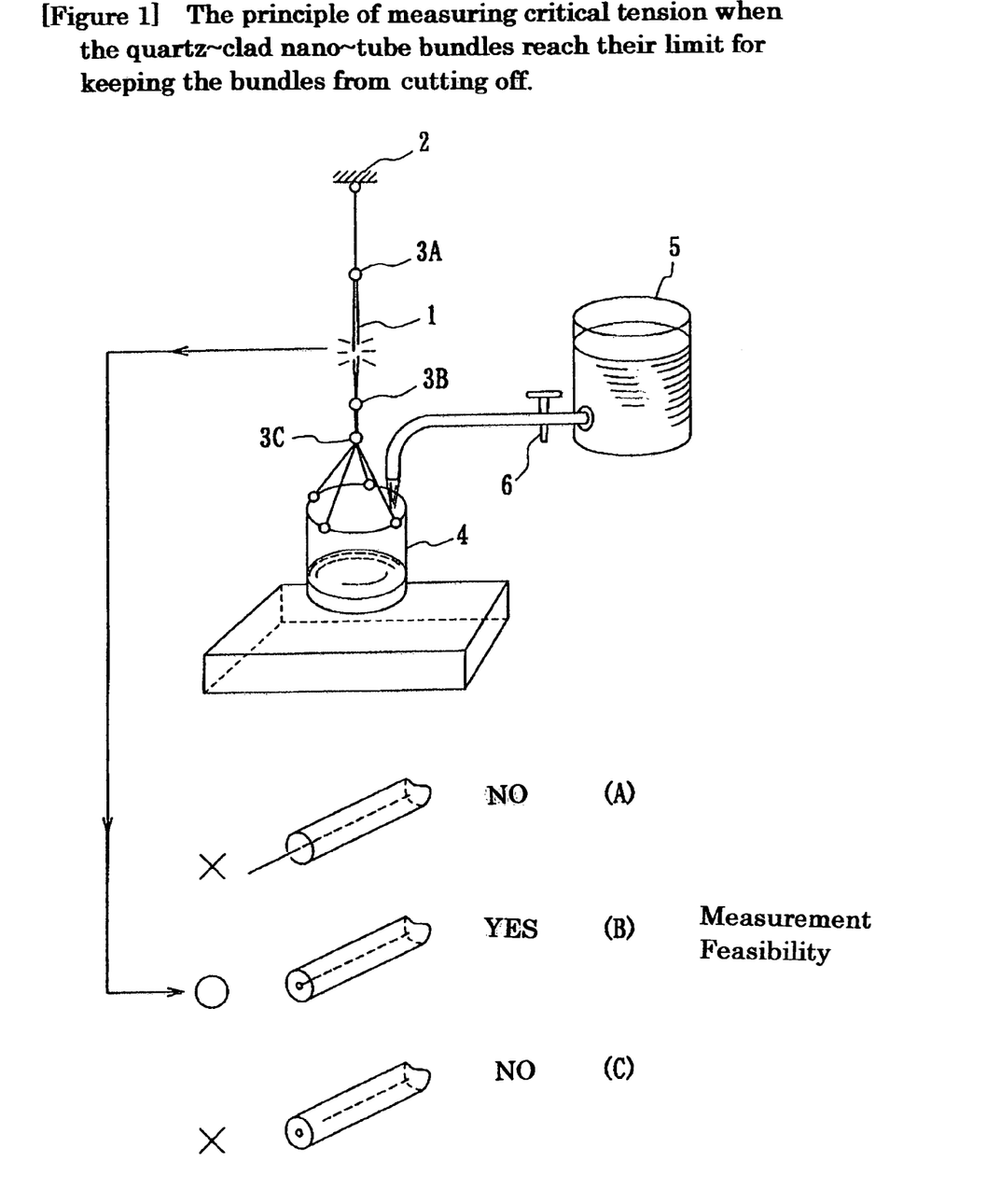
FIG. 1 is a schematic illustration of apparatus employable in the present invention in respect of the principle of measuring critical tension when the quartz-clad nanotube bundles reach their limit for keeping the bundles from breaking off.

The present inventor has measured the critical tension on the quartz-clad carbon nanostrip 1 (in FIG. 1) of a pair of wires, one end of which is pegged on the ceiling and the other end hangs the bucket 4 in FIG. 1 which is holding water supplied from the tank 5. Water from tank 5 in FIG. 1 is supplied into the bucket 4 through the adjusting valve 6 in FIG. 1. When tension of the quartz-clad carbon nanotube bundle reaches the critical value, the water flow is cut off. In order to estimate the critical tension per unit area of the cross-section of the carbon nanotube bundles, some adequate correction has to be taken into account for the additional weight of the bucket, etc.

FIGS. 1(A), (B), and (C) show three cases of quartz-clad carbon nanotube bundles after the bundles are cut off.

Namely:

(A) shows a case where the carbon nanotubes are left out without being cut.

(B) shows the case where the carbon bundles are cut out of the cross-section simultaneously so that they are co-planar with that of the quartz.

(C) is the case where the quartz is cut out first and the bundles remain behind.

Cases (A) and (C) do not satisfy the co-planar condition of measuring critical tension, hence the careful observation of the cross-section in Case (B) gives the critical tension per unit area of the nanotube bundles from the relative ratio of the bundle cross-sectional area to that of the quartz sheath.

One may repeat the previous question in the above paragraph, i.e. which of the two media is cut off first, the quartz sheath or the carbon nanotube bundles. For Case (B), careful observation of the cross-section shows that both quartz and the bundle must have been cut simultaneously, in a co-planar plane of the cross-section and since they are nearly rigid media in the microscope image. From the above consideration, the critical tension of the carbon nanotube bundle can be estimated from the relative ratio of the cross-sectional area of the bundle to that of the quartz sheath. The result demonstrates that the critical tension can reach the order of 10 tons wt/mm$^2$ which is such an extremely high value that only a perfect lattice of graphene sheet could possibly attain.

Figure 2:
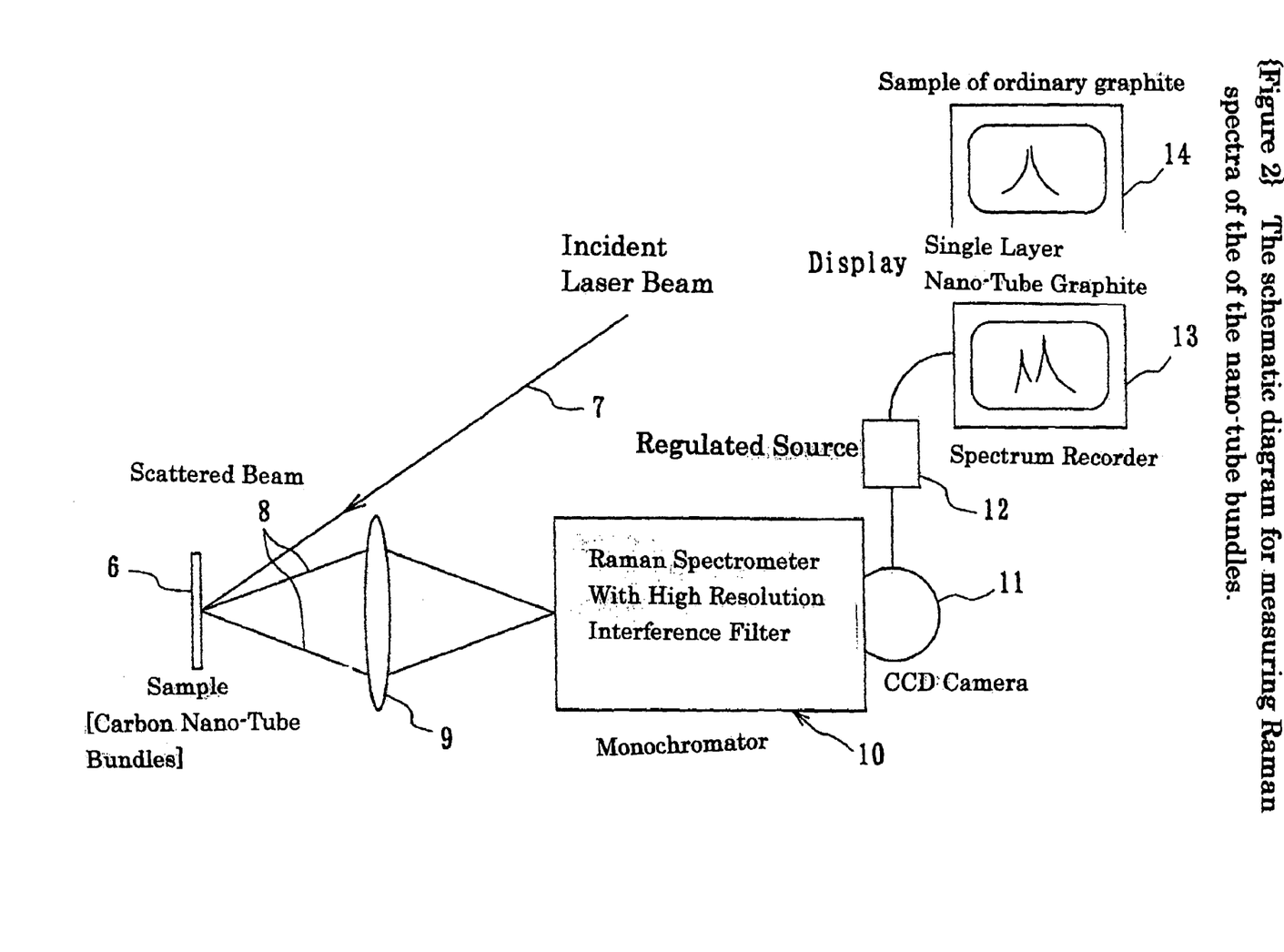
FIG. 2 is a schematic diagram showing measuring Raman spectra of the carbon nanotube bundles.

FIG. 2 shows the schematic diagram of the Raman spectrometry on carbon nanotube bundles 6, which are irradiated with (a) laser beam 7, and the scattered beams, 8, out of the bundles are focused through the lens, 9, on the entrance slit of the Raman spectrometer 10 which discriminates the desired wavelength component through an interference filter installed in 10. The output beam through the filter is detected by the CCD detector, 11, the weak output of which is amplified through the regulated power source, 12, and displayed on the recorder, 13. An example of spectrum is shown as the curve, 14.

Figure 3:
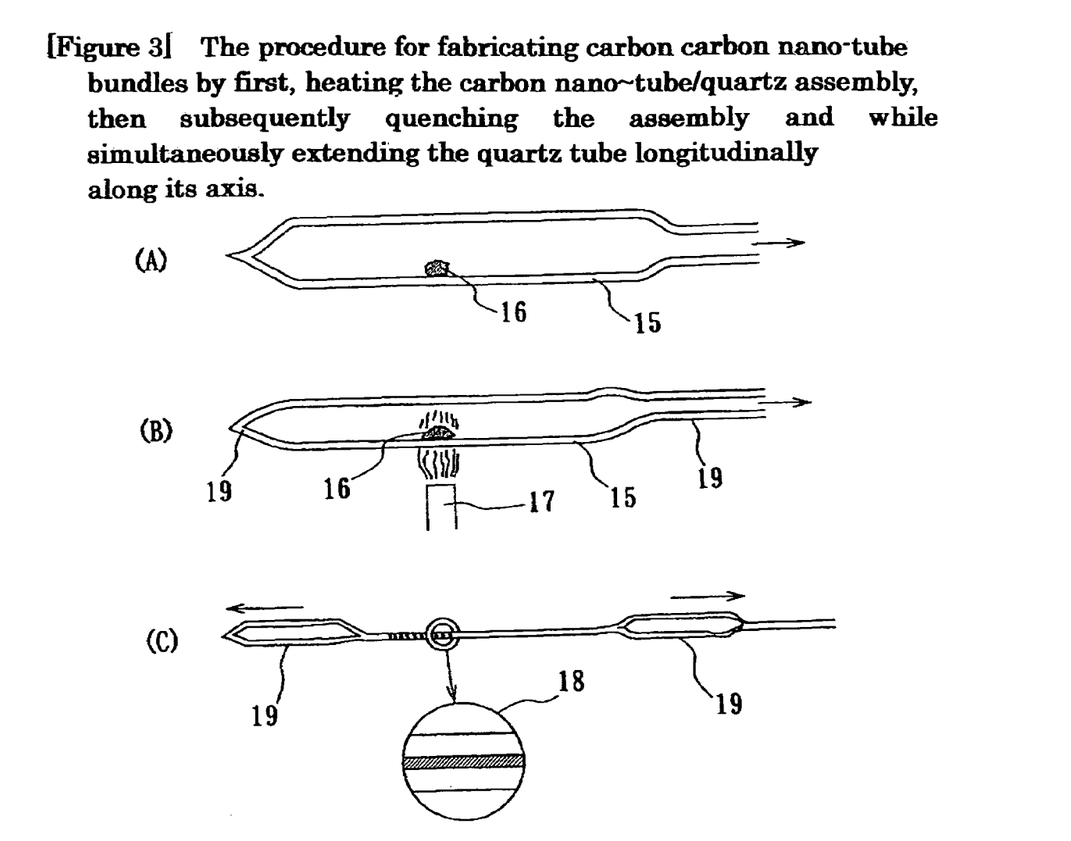
FIGS. 3(A)–3(C) illustrate respectively the method of fabricating carbon nanotube bundles by first heating the carbon nanotube/quartz tube assembly, then quenching the assembly while simultaneously extending the quartz tube longitudinally along its axis.

FIG. 3 shows the step-by-step heat treatment and axial extension of carbon nanotube bundles. The initial powder-like carbon nanotube material is vacuum-sealed in the quartz tube (A) of FIG. 3, and heated by use of the gas flame, 17. The quartz is heated until the sample inside reaches a temperature near 1200° C., and becomes incandescent. Then both ends 19, of the quartz tube in FIGS. 3(B) and (C), are pulled along the axial direction of the tube. During this axial extension or "drawing" process, the quartz is quenched to room temperature.

Figure 4:
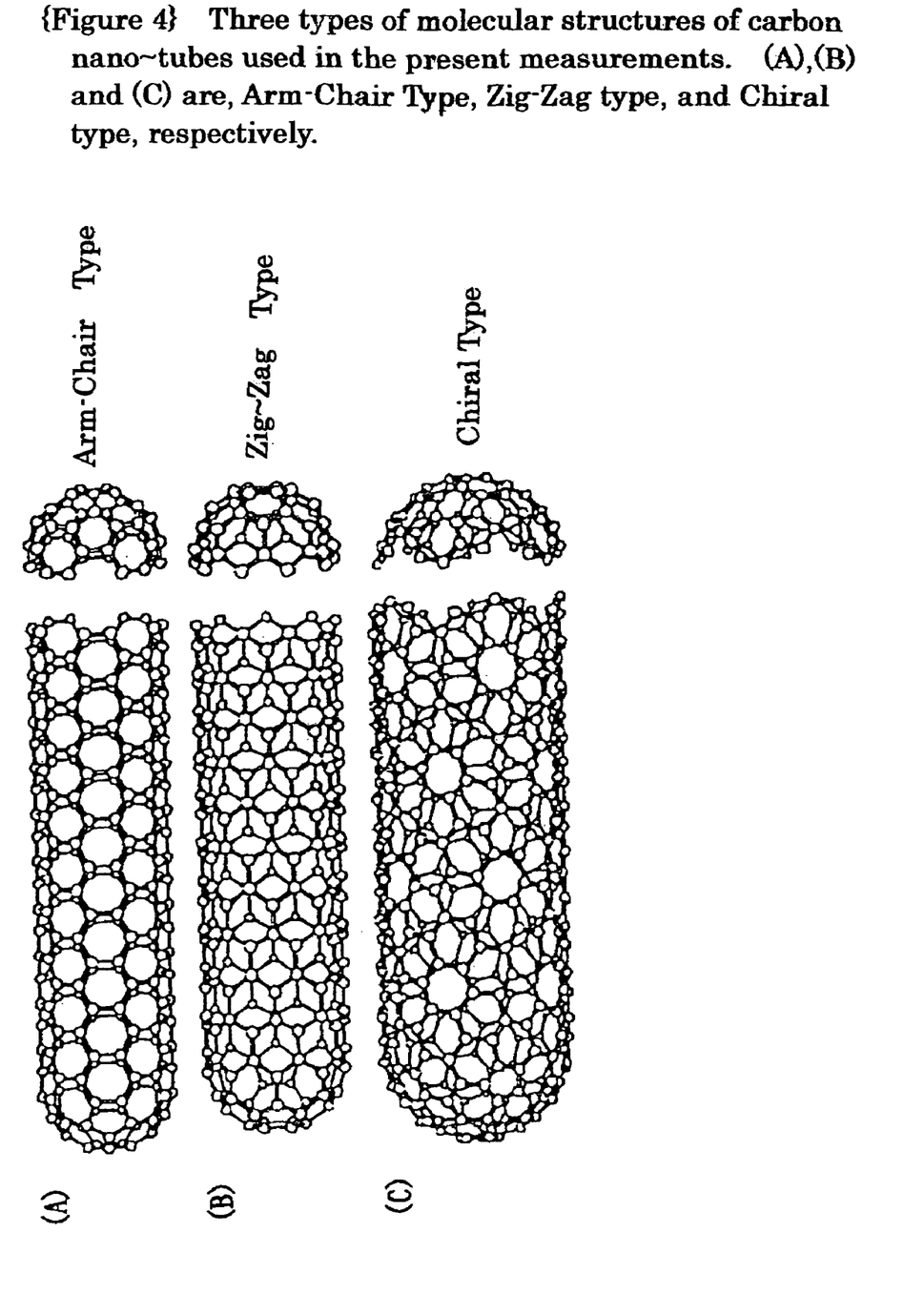
FIGS. 4(A)–4(C) illustrate three types of molecular structures of the carbon nanotubes, respectively, (A) Arm-Chair Type. (B) Zig-Zag Type and (C) Chiral Type.
Figure 5:
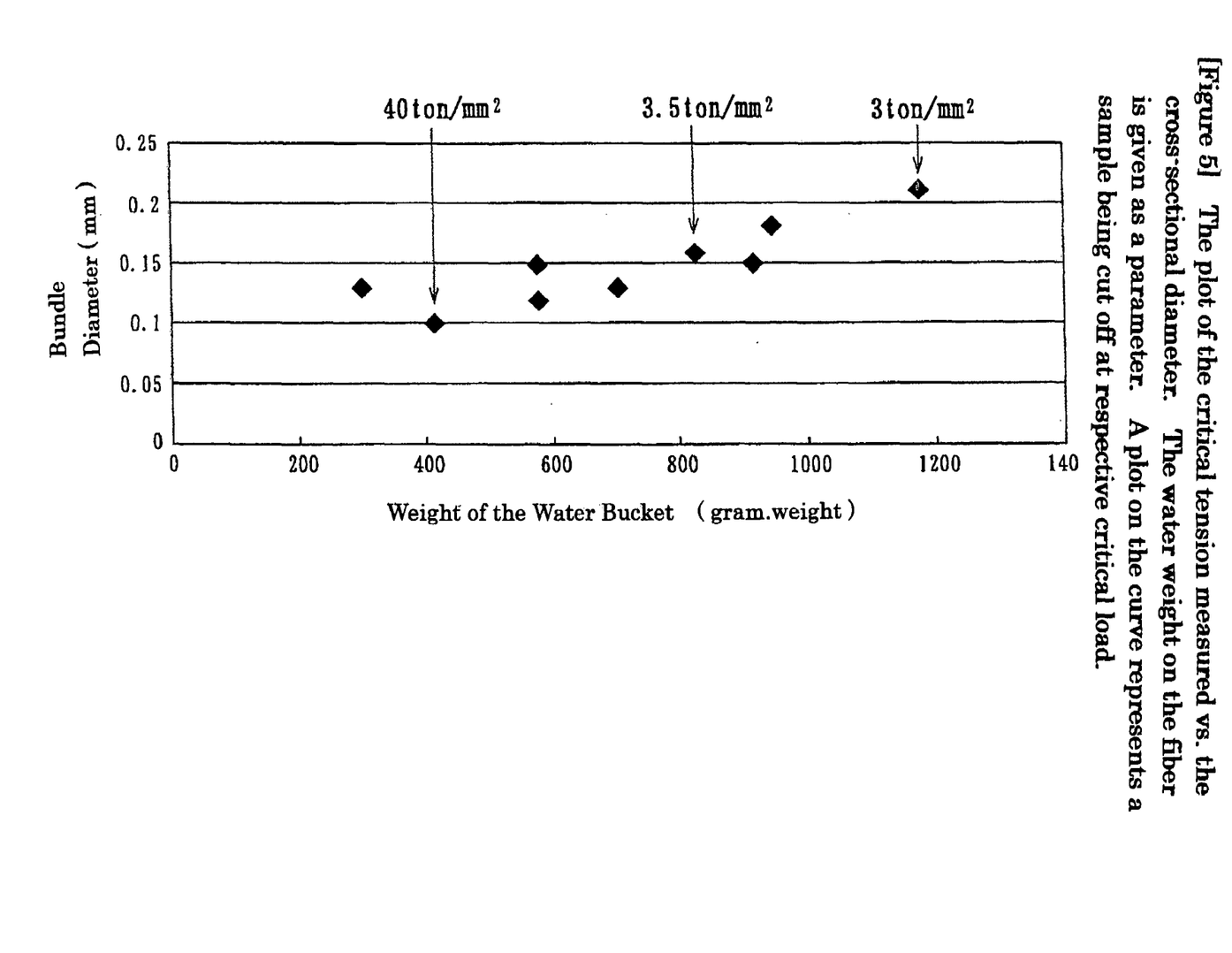
FIG. 5 is a plot of the critical tension measured vs. the cross-sectional diameter. The water weight on the fiber is given as a parameter.
Figure 6:
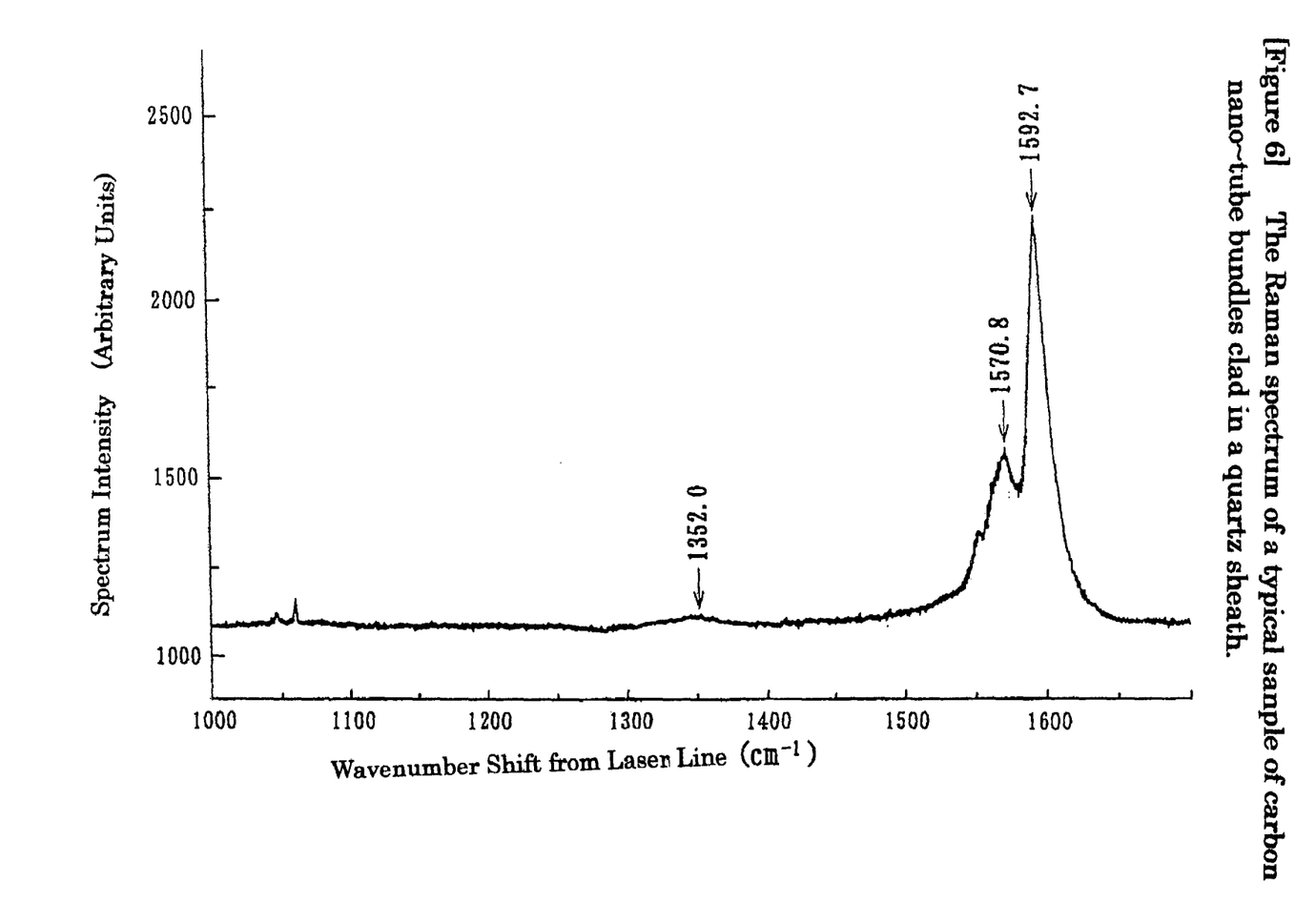
FIG. 6 is a plot of the Raman spectrum of a typical sample of carbon nanotube bundles clad in a quartz sheath.
Figure 7:
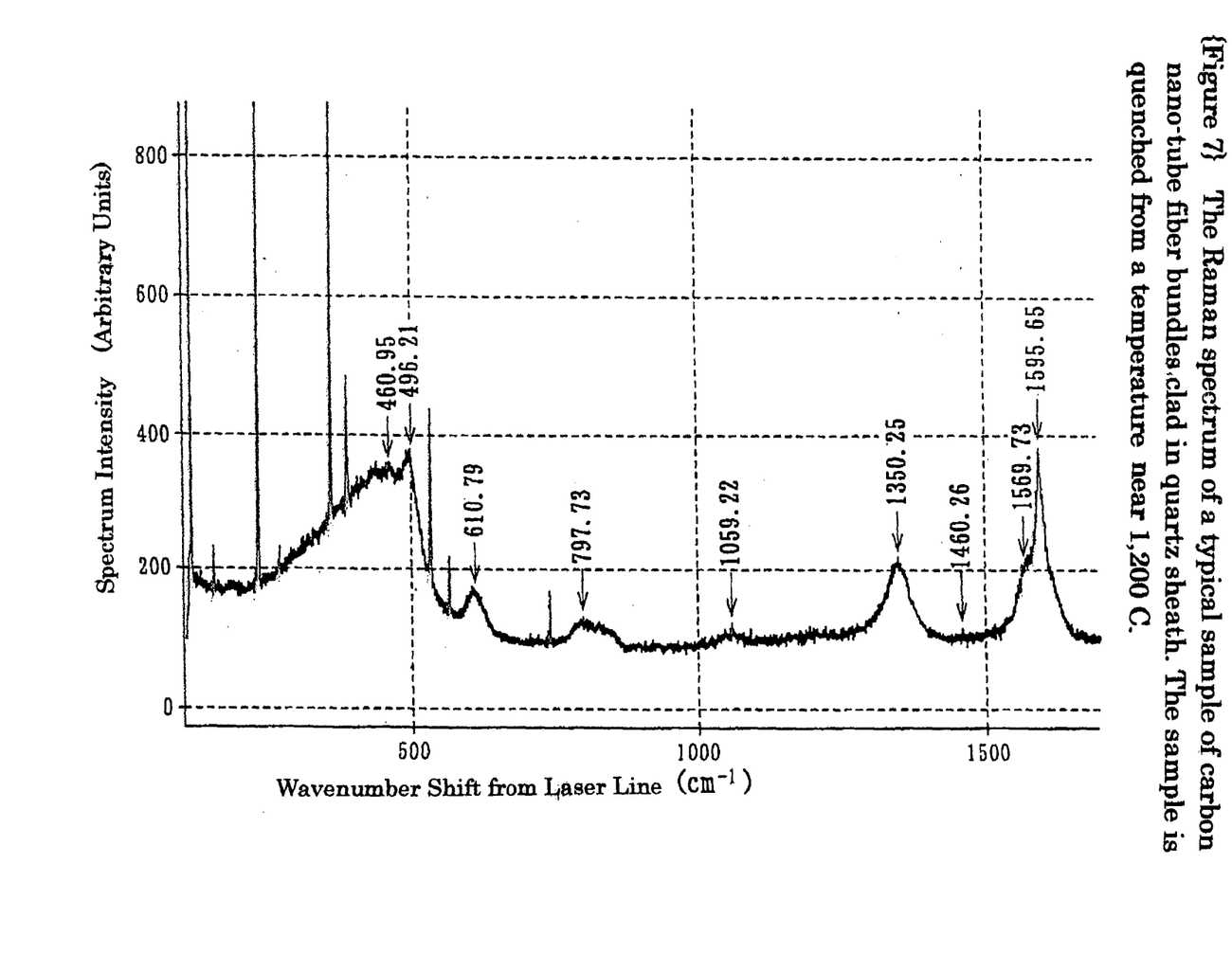
FIG. 7 is a plot of the Raman spectrum of a typical sample of carbon nanotube bundles clad in a quartz sheath. The sample is quenched from a temperature near 1,200° C.
Figure 8:
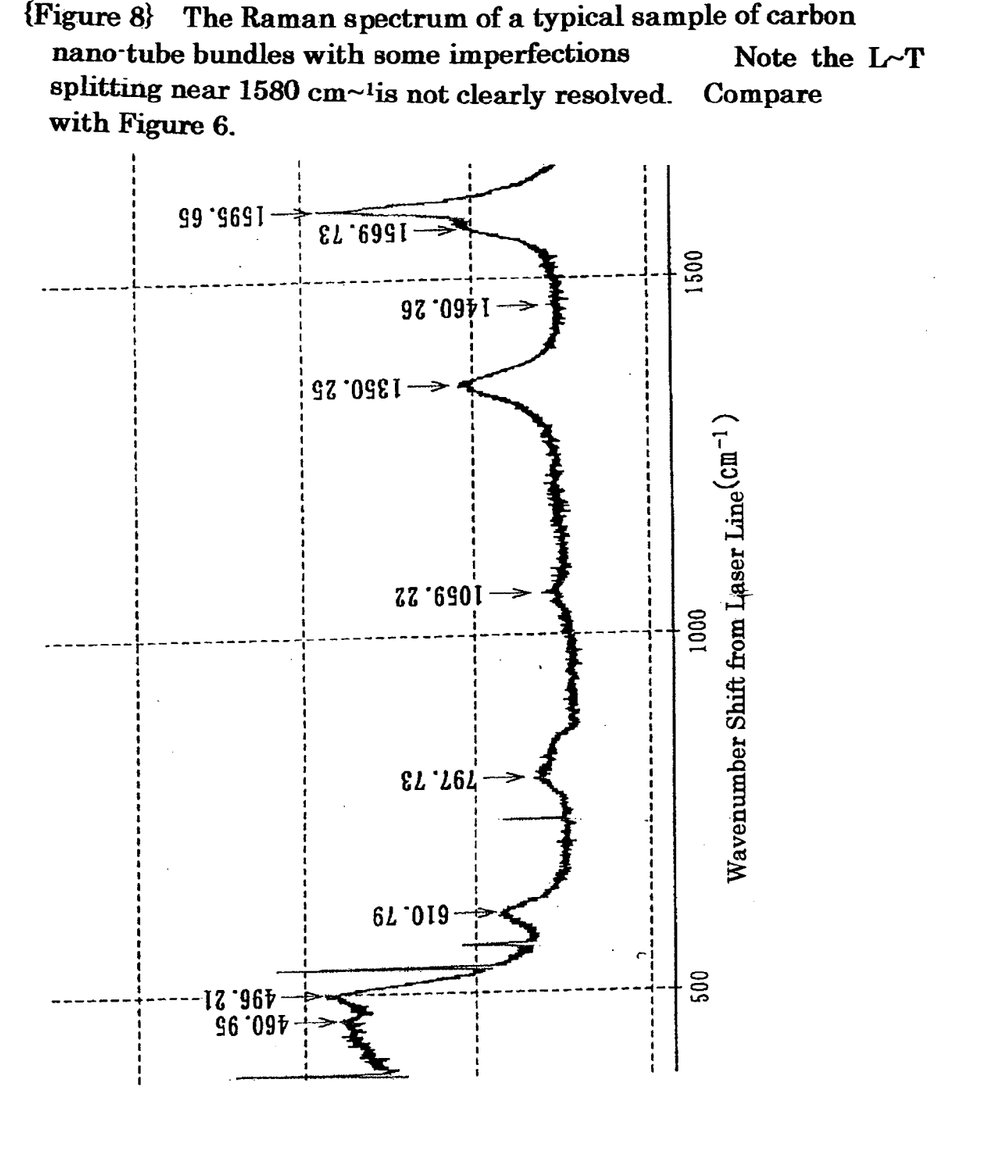
FIG. 8 is a plot of the Raman spectrum of a typical sample of carbon nanotube bundles with some structural imperfections.

FIG. 4 shows the schematic diagram of three types of molecular structures in single layer nanotubes, where (A) is called "Arm-Chair type", (B) "Zig-Zag type", and (C) the "Chiral type", respectively.

EXAMPLE 1

An example of fabricating this string-like product is given in the following:

Original powder material of carbon nanotube is sealed in vacuum in a quartz tube of 3 mm I.D., and 5 mm O.D. Then the quartz tube containing carbon nanotubes in "powder" form is heated until the quartz tube reaches a temperature between 900° C. and 1,300° C.

Note carbon becomes red-hot solid near 1,200° C.; the temperature at which the quartz tube is quenched down to room temperature. Simultaneously, the quartz is quenched and extended or drawn out to less than 0.1 mm O.D.

A computer-controlled picture by a CCD camera attached to an optical microscope shows that the carbon bundles possess a cross-section of 50 to 70 nm in diameter.

The carbon-nanotubes thus fabricated are analyzed in terms of Raman spectrometry which reveals that the measured spectrum shows a doubly-split spectrum in the neighborhood of 1580 cm$^{-1}$ in the Raman shift, coming from the breathing mode of the lattice vibration in the graphene plain. The presence of this double peak verifies that the graphene-like structure is retained in spite of the heat treatment for producing the nanotube bundles.

EXAMPLE 2

The samples used in these experiments are made in powdered form (grain size is 0.3 mm in diameter or less) and surface-treated in fluoric acid. These samples are dried in (a) nitrogen atmosphere (while) in the quartz (tube shown) in FIG. 3, (15) of about 3 mm I.D. Then the quartz tube containing the sample is heated in the mixed gas flame (17) of propane and oxygen. As soon as the sample becomes incandescent (about 1200° C.), the quartz tube is quenched in air, and simultaneously extended by applying tension from both ends. This mechanical expansion fabricates the carbon nanotube bundles of about 10 microns or less which may be examined under (a) microscope using a CCD camera. The camera serves to investigate the microstructure of the carbon nanotube bundle covered by the quartz sheath. Similar experiments must be performed to find the critical tension of the quartz sheath without carbon nanotube bundles.

(This Measurement Could be Used to Estimate the Critical Tension of the Bundles alone without Quartz Sheath.)

For measurements of the carbon nanotube bundles and for the quartz sheath alone, both ends of the samples are connected to thicker brass wires as shown in FIGS. 1(A) and (B). Tensions on the bundles or on the quartz sheath increase with water load in the bucket, 4, in FIG. 1. The critical tension of the quartz-clad carbon nanotube bundles minus the critical tension of the quartz sheath alone is regarded as the critical tension of the nanotube bundles.

The quartz fibers examined by CCD camera show that the fiber has a thickness of 0.2–0.3 microns. A preliminary measurement shows that the critical tension of such fiber is equal to about 100 to several 100 (4 of nanotube bundles corresponding to the critical tensions of 3 tons wt./mm, 2 to 40 tons wt./mm2. This relatively large variation in the critical tension probably comes from local defects in the nanotube structures and the presence of local frictions between nanotubes in a bundle as a result of chemical surface treatment on the nanotubes. Even so, the lowest value of the critical tension in the bundle is still one order of magnitude higher than that of the quartz sheath.

The invention claimed is:

1. An assembly comprising carbon nanotube bundles sealed in an axially extended quartz protective sheath, which sheath is chemically stable and prevents reaction of the bundles with acid or other toxic substances.

2. The assembly of claim 1, wherein the bundles consist of about 100 to 1000 carbon nanotubes and the carbon nanotube bundles diameters are 1 micron or less, the bundles having a critical tension of up to about 10 tons wt/mm$^2$.

3. The assembly of claim 1, wherein the carbon nanotube bundles are—sealed in a vacuum and the quartz sheath O.D. is less than about 0.1 mm, wherein the carbon nanotube bundles have a cross-section of about 50 to 70 nm, and the quartz sheath is a heat treated, quenched cladding that is heat resistant up to about 900° C.

* * * * *